F. VOGEL.

BEST AVAILABLE COPY

TRACK LINING JACK.

APPLICATION FILED MAY 10, 1921.

Reissued Oct. 31, 1922. 15,484.

Inventor

F. Vogel,

WITNESSES:—

Chas. L. Geisbauer

Emory Graff

By D. A. Rehan

Attorney

Draftsn

44

Reissued Oct. 31, 1922. Re. 15,484

UNITED STATES PATENT OFFICE.

FREDERICK VOGEL, OF WYETH, OREGON.

TRACK-LINING JACK.

Original No. 1,308,310, dated July 1, 1919, Serial No. 269,198, filed January 2, 1919. Application for reissue filed May 10, 1921. Serial No. 468,400½.

*To all whom it may concern:*

Be it known that I, FREDERICK VOGEL, a citizen of the United States, residing at Wyeth, in the county of Hood River, State of Oregon, have invented certain new and useful Improvements in Track-Lining Jacks, and I do hereby declare the following to be a full, clear, and exact description of the invention, such as will enable others skilled in the art to which it appertains to make and use the same.

The invention relates to a track liner or jack and has for its primary object to provide a device of this character, wherein minimum labor is required in the handling thereof so that the railway track can be properly lined with despatch and avoid the necessity of the use of a plurality of implements ordinarily employed for this purpose, the device being of novel construction so that it can be readily and easily adjusted to suit the occasion, for the lifting and the positioning of a track rail at the proper point and for the automatic handling of the rail in the lining of the track.

Another object of the invention is the provision of a device of this character, which is readily portable, simple in construction, thoroughly reliable and efficient in operation, strong, durable and inexpensive to manufacture.

With these and other objects in view, the invention consists in the features of construction, combination and arrangements of parts as will be hereinafter fully described in the accompanying drawing and pointed out in the claims hereunto appended.

In the accompanying drawing.

Similar reference characters indicate corresponding parts throughout the several views in the drawing.

Figure 1:
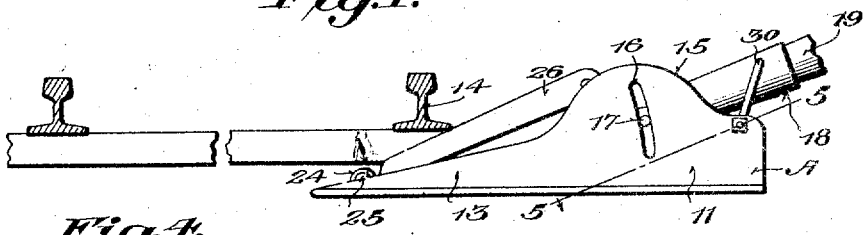
Figure 1, is a vertical transverse sectional view through a track showing the device constructed in accordance with the invention, positioned for lining one of the rails of the track.
Figure 4:
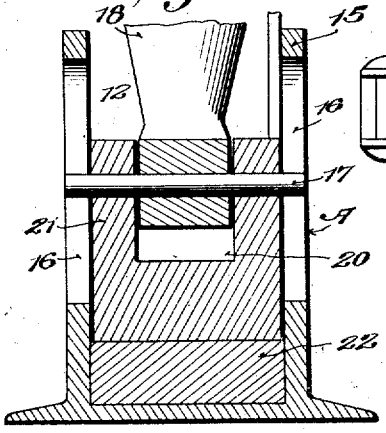
Figure 4, is a vertical transverse sectional view on the line 4—4 of Figure 2.
Figure 2:
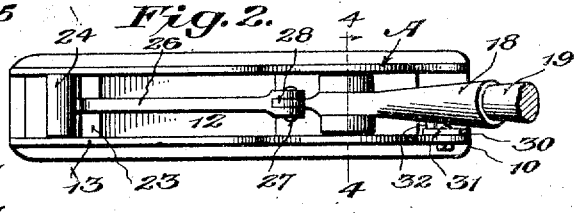
Figure 2, is a top plan view thereof removed from the track.
Figure 3:
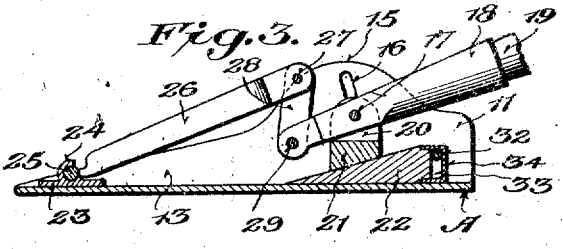
Figure 3, is a vertical longitudinal sectional view.
Figure 5:
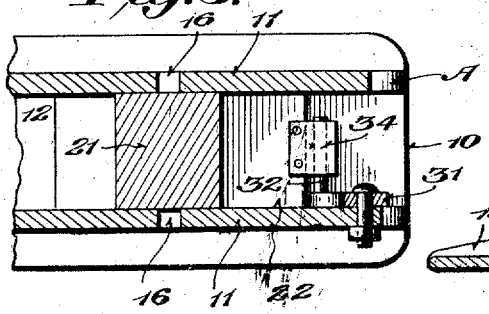
Figure 5, is a sectional view on the line 5—5 of Figure 1.
Figure 6:
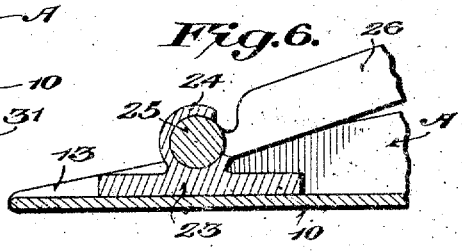
Figure 6, is a fragmentary vertical longitudinal sectional view through the lifting bar and the foot showing in detail the coupling or connection therebetween.

Referring to the drawing in detail, the device comprises a base frame A including a bottom 10 formed with spaced vertical sides 11 rising therefrom, which are disposed in parallel relation to each other and constitute a channel space 12 longitudinally through the base frame. The base frame A throughout one end portion is of outwardly tapered formation to constitute a wedge extension 13, which is adapted to be positioned beneath the rail 14 of a railway track when the base frame A is supported upon the bed ballast for the track, the base frame being positioned at one point between the cross-ties upon which the rails 14 of the track are supported.

The sides or cheeks 11 of the base frame A intermediate the ends thereof are enlarged at 15 to increase the height of said sides or cheeks, and formed in this enlargement 15 are elongated slots 16 which are slightly angularly disposed relative to the perpendicular or vertical axis and in which is slidably fitted and transversely disposed a fulcrum pivot or pin 17 having mounted thereon between the sides 11 or the cheeks a rocking operating arm 18 in which is detachably fitted a handle 19 and this arm constitutes the main operating or controlling lever of the device.

The pivot or fulcrum pin 17 is carried in a fork or furcated upper end 20 of a fulcrum block 21 which is located in the channel 12 of the base frame A, and is adapted to play upon an adjustable wedge shaped block 22 slidably supported upon the bottom 10 in the channel 12 to move longitudinally in the base frame A and thereby raising or lowering the fulcrum block 21, to vary the leverage of the operating arm 18, as will be apparent, the adjusting block 22 being manually operated in a manner presently described.

Arranged forwardly or in advance of the operating arm 18 in the channel 12, in the base frame A, and adapted to rest upon the bottom 10 of said frame is a creeper or slide foot 23 having a ball socket head 24 in which is loosely engaged the ball terminal 25 of a lifting bar 26, which at its other end is pivoted at 27 to a raising and lowering link 28 pivoted at 29 to the inner or free end of the operating arm 18, so that the lifting bar 26 is inclined in the direction of the wedge extension 13 of the base frame A, and is adapted to be disposed in bridging relation beneath the track rail 14 to be operated upon for lifting and moving said rail when the device is operated for the purpose of lining the track.

The creeper or foot 23 as the rail 14 acted upon approaches the other rail of the track, will creep or slide upon the bottom 10 of the base frame A, so that the lifting bar will follow the rail 14 in the operation of the device. It is of course understood that the link 28 is disposed inwardly at an angle toward the rail operated upon so that the lifting bar 26 will not have retrograde movement in the operation of the device.

Pivoted to one of the sides or cheeks 11 of the base frame A is a hand lever 30 which is formed with a crank inner end 31, carrying a laterally connecting pin 32 to engage in a vertical channel 33 in a tail-piece 34 formed on the wedge shaped block 22, so that the lever 30 when actuated will slide the block 22 to vary the elevated position of the fulcrum block 21, and thereby increasing or decreasing the leverage of the operating arm 18 which is manually actuated to control the lifting bar 26 in the use of the device for lining track rails.

If desired, the foot or creeper 23 can be made stationary in the base frame A which will not interfere with the working of the lifting bar 26 to raise and move the track and rail 14, in the use of the device as a track liner or jack.

I claim:

1. A device of the character described, comprising a base, a rocking lever supported within the base for raising and lowering movement, a fulcrum block for said lever, means for raising and lowering the fulcrum block, and a lifting bar having link connection with said lever.

2. A device of the character described, comprising a base, a rocking lever supported within the base for raising and lowering movement, a fulcrum block for said lever, means for raising and lowering the fulcrum block, a lifting bar having link connection with said lever, and means for swingingly supporting the outer end of the lifting bar.

3. A device of the character described, comprising a base, a rocking lever supported within the base for raising and lowering movement, a fulcrum block for said lever, means for raising and lowering the fulcrum block, a lifting bar having link connection with said lever, means for swingingly supporting the outer end of the lifting bar, and means for actuating and raising and lowering means for the fulcrum block.

4. A device of the character described, comprising a base, a rocking lever supported within the base for raising and lowering movement, a fulcrum block for said lever, means for raising and lowering the fulcrum block, a lifting bar having link connection with said lever, means for swingingly supporting the outer end of the lifting bar, means for actuating the raising and lowering means for the fulcrum block, and sides on the base frame and forming a channel therebetweeen for the fulcrum block and the raising and lowering means therefor.

5. A track lining jack comprising a channel base frame having slots in its sides, a rocking arm arranged between the sides and having a pivot pin slidable in the slots, a fulcrum block mounted on the pivot pin, a wedge shape member to raise and lower the fulcrum block, a foot in advance of the rocking arm and resting upon the base, a lifting bar swingingly connected to the foot, and a link pivot connecting the lifting bar and rocking lever.

6. A track lining jack including a base, an inclined rail lifting bar adapted to engage beneath a rail at one edge thereof, means for supporting said bar to permit a forward sliding movement thereof with the rail, and means for raising and lowering said bar.

7. A track lining jack including a base, an inclined rail lifting bar having a slidable support at one end, and means for raising and lowering said bar, said means including means preventing retrograde movement of said bar.

In testimony whereof I hereunto affix my signature in the presence of two witnesses.

FREDERICK VOGEL.

Witnesses:
ARTHUR HOWELL,
BURTON P. HEAD.